(12) United States Patent
Hansen et al.

(10) Patent No.: US 7,357,893 B2
(45) Date of Patent: Apr. 15, 2008

(54) METHOD AND DEVICE FOR THE PRODUCTION AND FILLING OF CONTAINERS

(76) Inventors: Bernd Hansen, Talstr. 22-30, 74429 Sulzbach-Laufen (DE); Hans Weiss, Im Reutele 2, 74429 Sulzbach-Laufen (DE)

(*) Notice: Subject to any disclaimer, the term of this patent is extended or adjusted under 35 U.S.C. 154(b) by 750 days.

(21) Appl. No.: 10/450,901

(22) PCT Filed: Dec. 11, 2001

(86) PCT No.: PCT/EP01/14534

§ 371 (c)(1),
(2), (4) Date: Oct. 31, 2003

(87) PCT Pub. No.: WO02/49821

PCT Pub. Date: Jun. 27, 2002

(65) Prior Publication Data

US 2004/0065983 A1    Apr. 8, 2004

(30) Foreign Application Priority Data

Dec. 19, 2000 (DE) .............................. 100 63 282

(51) Int. Cl.
*B29C 49/04* (2006.01)
*B29C 49/46* (2006.01)

(52) U.S. Cl. ...................... 264/525; 264/536; 264/524; 264/542; 264/540; 264/150; 264/159; 425/524; 425/532

(58) Field of Classification Search .............. 264/85, 264/525, 536, 524, 542, 540, 150, 159; 425/524, 425/532, 538
See application file for complete search history.

(56) References Cited

U.S. PATENT DOCUMENTS

| | | | | |
|---|---|---|---|---|
| 3,597,516 A | * | 8/1971 | Harwood | ..................... 264/525 |
| 3,691,267 A | | 9/1972 | Takehara | |
| 4,045,945 A | * | 9/1977 | Moller et al. | ................. 53/167 |
| 4,498,508 A | * | 2/1985 | Scholle et al. | ................. 141/5 |
| 5,261,545 A | | 11/1993 | Ota et al. | |
| 5,759,218 A | * | 6/1998 | Martin et al. | ............. 55/385.1 |
| 5,962,039 A | | 10/1999 | Katou et al. | |

FOREIGN PATENT DOCUMENTS

| | | |
|---|---|---|
| DE | 2818349 | 11/1978 |
| EP | 0924047 | 6/1999 |
| JP | 60049919 | 3/1985 |
| JP | 04147824 | 5/1992 |

* cited by examiner

*Primary Examiner*—Suzanne E. McDowell
(74) *Attorney, Agent, or Firm*—Roylance, Abrams, Berdo & Goodman, L.L.P.

(57) ABSTRACT

In a method for the production and filling of containers (12), at least one tube (3) of plasticized plastic material is extruded into an open mold (6). The tube (3) is bonded at its advancing end on closing the mold (6) to form the container base. The tube (3) is severed above the mold, by a separating element (21) to form a filling opening. The mold (6) having the tube (3) with a filling opening is moved to a filling position in which the container is filled after the tube (3) formed in the mold by generating an expanding pressure gradient acting on the tube (3). During the movement of the mold (6) into the filling position, the filling opening of the tube (3) is covered by a sterile barrier (23).

13 Claims, 2 Drawing Sheets

METHOD AND DEVICE FOR THE PRODUCTION AND FILLING OF CONTAINERS

FIELD OF THE INVENTION

The present invention relates to a process for the production and filling of containers, in which at least one tube of plasticized plastic material is extruded into an open mould. The tube is bonded at its leading end when the mould is closed to form the bottom of the container. The tube is severed above the mould by a separating element to form to form a fill opening. The mould, together with the tube having the fill opening, is moved to a filling position in which the container is filled, after being formed in the mold by production of a pressure gradient acting on and expanding the tube. The present invention also relates to a device for application of such process.

BACKGROUND OF THE INVENTION

A process of this type and device are described in U.S. Pat. No. 5,962,039 and in JP-A-600-49919. These processes of the state of the art permit automated moulding (blow moulding or vacuum molding), filling, and sealing of vessels in a cost-effective manner. If highly sensitive products are produced, ones such as pharmaceuticals for which the international standards relating to aseptic packaging are to be met, the mould, when moved into the filling position, is positioned beneath a so-called sterile filling space (ASR). In the ASR, sterile air flows over the open fill opening of the containers and creates effective protection against entry of germs, until movable top jaws are closed after completion of the filling process in order to form the desired top seal of the container by a combined vacuum-bonding process.

While the fill opening is effectively protected in the respective state-of-the-art processes and devices when this opening in the filling position by the sterile filling space, the uncovered fill opening is not fully protected during displacement of the mould from the extrusion position, in which the tube formed is severed below the extruder nozzle to form the fill opening, even if the process is conducted in a clean room. The tube having the fill opening is open at the top during movement of the mold into the filling position.

JP-A-4147824 discloses covering the fill opening of the tube during movement of the mould into the filling position by a heatable cylinder. U.S. Pat. No. 5,261,545 discloses mounting an infrared heater above the fill opening in order to reduce the number of germs. However, even in these instances, the fill opening is exposed, at least for a brief period, during change in the individual production positions. Thus, the danger exists that the interior of a container could be contaminated by germs or other particles.

SUMMARY OF THE INVENTION

An object of the present invention is to provide a process and a device providing better protection of the open fill opening.

This object is attained according to the present invention by a sterile barrier in the form of a heatable plate. The plate may be heated to a germ-killing temperature, and is movable together with the separating element severing the tube. After severing of the hose, the danger of the possibility of foreign matter falling into the open fill opening before the mould reaches the sterile filling space is prevented. The sterile barrier also blocks access by germs to the fill opening during this segment of the process. The process of the present invention is accordingly suitable especially for the production of highly sensitive products for the medical/pharmaceutical area of application.

The sterile barrier is in the form of a heatable plate movable together with the separating element severing the tube. The plate is heated to a germ-killing temperature, preferably above 150° C. Since the plate moves with the cutting edge severing the tube, the fill opening is covered by the heated plate even as the tube is being formed, that is, at no time is the fill opening uncovered.

Especially favorable conditions are established in this process if the separating element is in the form of a cutting edge which is immediately adjacent to the heatable plate.

A cost-effective process with short cycle times is obtained if the heatable plate with the cutting edge for severance of the tube mounted on its leading edge is moved from a retracted initial position to an operating position in a direction in which the plate is mounted above the path of movement of the mould leading into the filling position. By this mounting, the fill opening is covered by the plate throughout its travel to the filling position. The plate and cutting edge are then moved back from the operating position to the initial position after the mould has reached the filling position.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
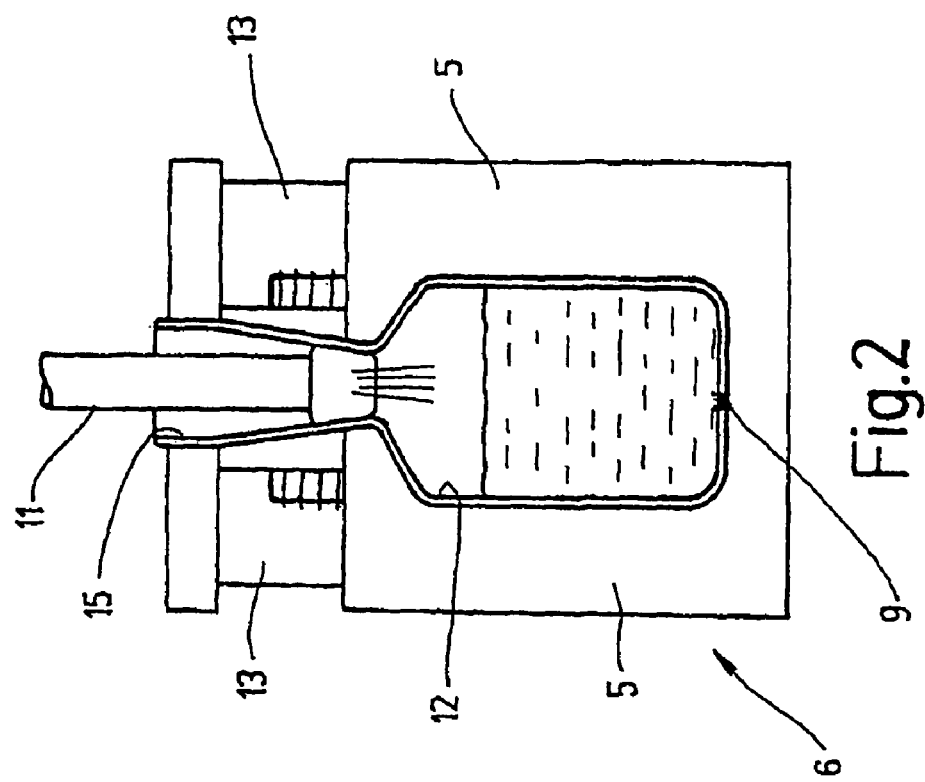
FIG. 1 is a simplified diagrammatic side elevational view of an open blowing mould and an extrusion head positioned above it for forming a tube of plasticized plastic.
Figure 2:
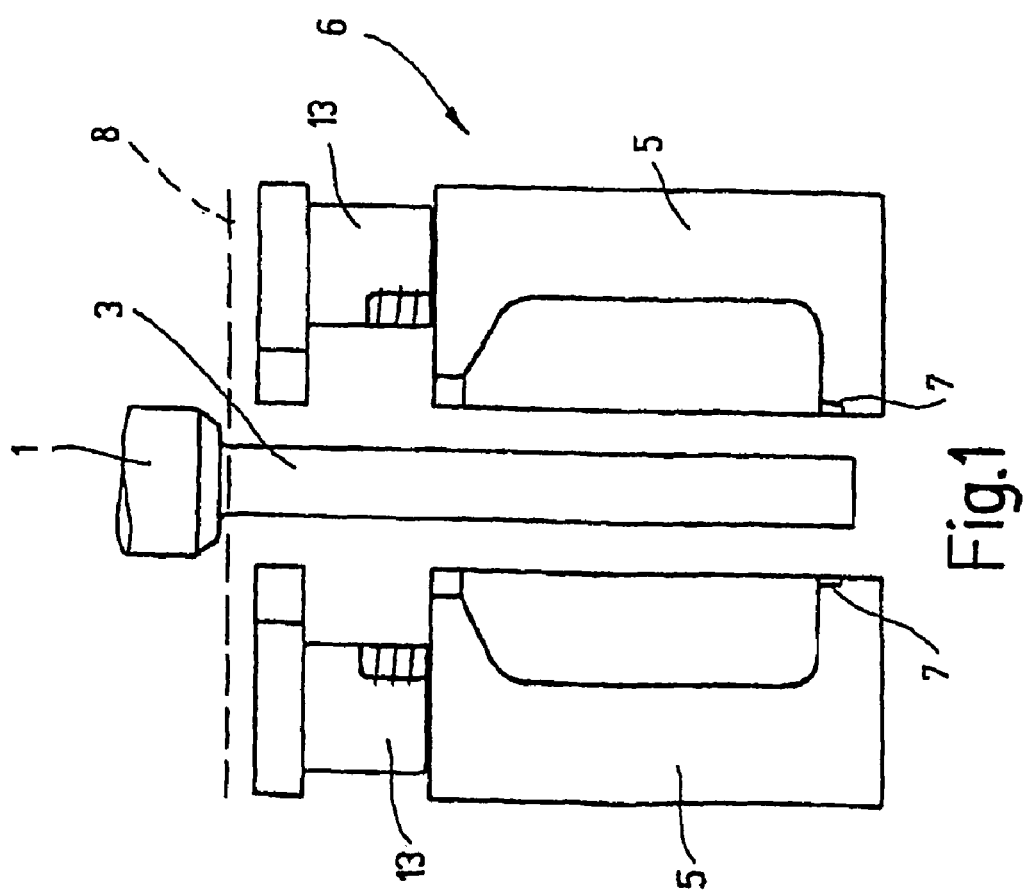
FIG. 2 is a side elevational view of the partly closed blowing mould of FIG. 1 after transfer to a filling position and after formation of the container to be filled.

FIGS. 1 and 2 illustrate an assembly such as is used within the framework of the conventional Bottlepack® system for production of plastic containers in the blow moulding process. A tube 3 of melted plastic is extruded by an extruder assembly 1 between the two mould halves 5 of a mould 6 illustrated in FIG. 1. After extrusion of the tube 3 into the opened mould 6, the tube 3 is severed between the nozzle outlet of the extruder assembly 1 and the top of the mould 6. In FIG. 1 the line of separation is shown as a broken line 8. FIG. 2 shows the mould 6 in the partly closed state, the shaping components for the body of the container 12 to be moulded from the tube 3, that is, the mould halves 5, being brought into contact with each other so that the bottom bevel edges 7 on the lower end of the tube 3 execute a bonding process to seal the tube 3 to a bond seam 9 (FIG. 2) on the bottom side.

FIG. 2 shows the mould 6 in a filling position in which the mould has been displaced laterally from the position illustrated in FIG. 1. In this filling position, the container 12, which has previously been formed, is charged with content through the fill opening 15. Blown air is introduced into the open fill opening 15 through a blast arbor (not shown). FIG. 2 shows the end of the fill arbor 11 introduced into the fill opening 15 for the filling operation. Forming and charging of the container may also be effected by a combined blast-fill arbor in place of the fill arbor 11 and a previously introduced blast arbor.

In the filling position shown in FIG. 2, the mould is positioned below a so-called sterile filling space (ASR), which is not shown in FIG. 2. The ASR acts as aseptic shielding of the fill opening 15 which is formed by the preceding severance process on the tube 3, along the line of separation 8 indicated in FIG. 1. After the container 12 has been charged, the fill arbor 11 is moved away upward and the movable top bonding jaws 13, still open, of the mould 6 are brought together in order to effect shaping and/or sealing the container neck by these jaws simultaneously by bonding. By the bonding jaws 13 illustrated in FIGS. 1 and 2, external threading is formed on the neck of the container for a screw-on cap which may be provided in addition to sealing by bonding, for example, one in the form of a screw-on cap with a puncture pin in it.

Figure 3:
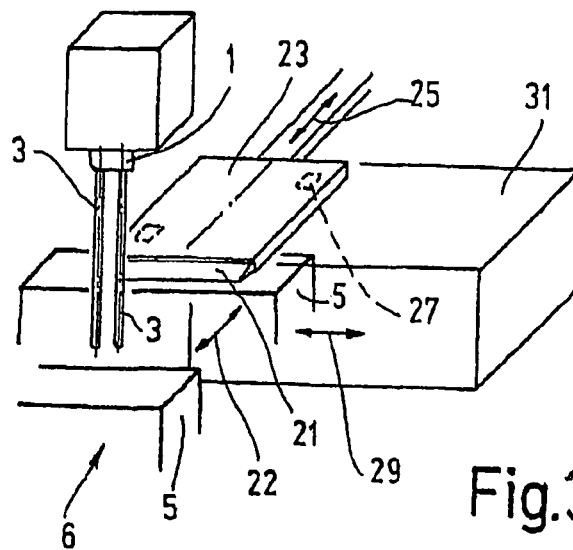
FIGS. 3 to 5 are perspective views of greatly simplified diagrams illustrating the course of the process according to an embodiment of the present invention.
Figure 4:
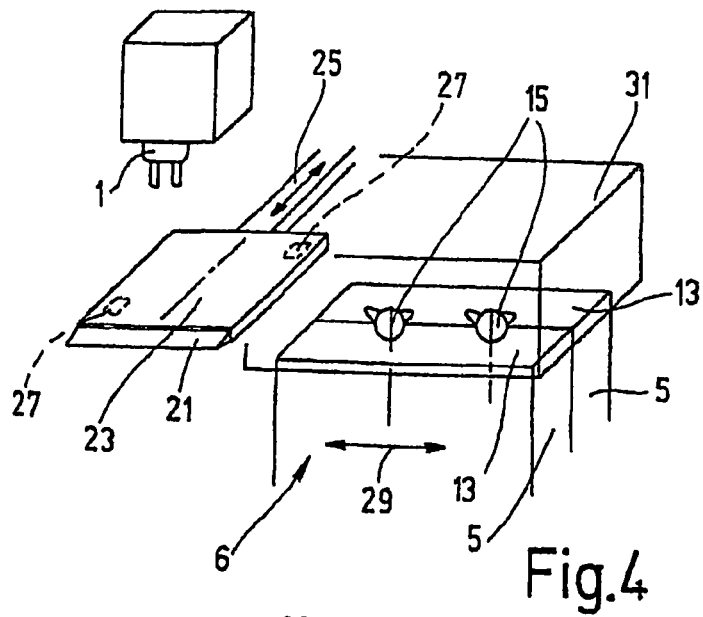
Figure 5:
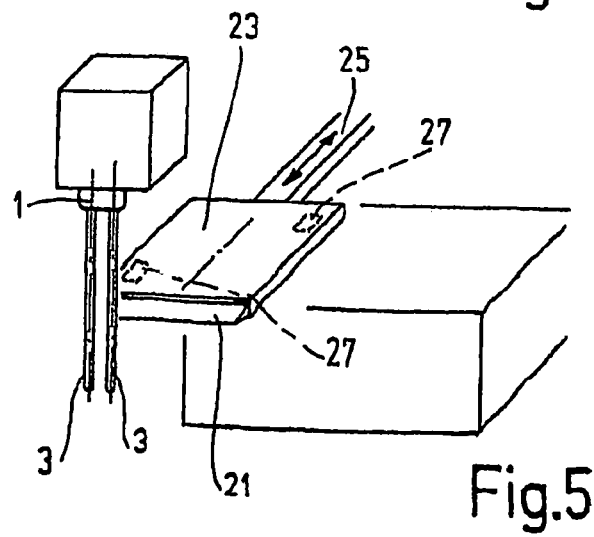

FIGS. 3 to 5 illustrate by greatly simplified diagrams, the sequence of the process of the present invention on the basis of an example for the simultaneous production of two small-volume containers. Two tubes 3 are extruded by the extruder assembly 1 into juxtaposed moulding cavities of the open mould 6 (see FIG. 3). The mould 6 is indicated only by outlines of the mould halves 5, which may be moved in the directions indicated by the double arrow 22 to open and close the mould.

FIG. 3 illustrates the operating state before severance of the extruded tubes 3. A heatable cutting edge 21 serves as the separating element. A heatable plate 23 has a front edge mounted so as to be contiguous with the cutting edge 21, and is shown in the retracted initial position. For the purpose of severing the tubes 6, plate 23 and cutting edge 21, which may be moved back and forth in the directions indicated by the double arrow 25, are moved from the initial position shown in FIG. 3 into the operating position (FIG. 4).

The heatable plate 23 has a surface formed of stainless steel, has an imbedded heating assembly (not shown) whose activity may be controlled by temperature sensors 27. Together with the cutting edge 21, the plate 23 is heated to a germ-killing temperature, preferably higher than 150° C., more preferably higher than 170° C. or about 200° C., and still more preferably in the range above 200° C., so that the plate 23 represents a sterile barrier. Plate 23 is situated, when in the advanced operating position, above the openings 15 in the tubes 3 formed in the separation process. In the next step illustrated in FIG. 4, the mould 6 is now displaced from the extrusion position (FIG. 3) in the direction indicated by the double arrow 29 into the filling position shown in FIG. 4. The open fill openings 15 at the top of the mould 6 at this time are positioned below the plate 23 remaining in the advanced operating position, and accordingly are covered by this sterile barrier. FIG. 4 illustrates the operating state in which the mould 6 has reached the filling position, in which the fill openings 15 are now positioned below a sterile filling space 31. As is to be seen from FIG. 4, the plate 23 extends along the path of movement of the mould 6 leading to the filling position far enough so that the entire area of this path of movement is covered, that is, the fill openings 15 leave the area of plate 23 only when they have entered the sterile filling space 31.

Only after this filling position has been reached, plate 23 and cutting edge 21 are again retracted from the advanced operating position to the initial position, in which the cutting 21 edge in turn is in the initial position for severance of the tubes 3 formed in the next extrusion cycle (see FIG. 5).

The essential feature of the present invention that the fill openings formed in the process of severance of the extruded tubes are covered by a sterile barrier from the moment of their formation until the filling position protected by the sterile filling space 31 has been reached is explained in the foregoing on the basis of the example of a heatable plate 23 with a heatable cutting edge 21 positioned on its front side. It is to be noted that essentially use of a different kind of separating element and a heatable component forming a sterile barrier of a different configuration is also possible. For example, a heated wire may be provided in place of a knife-like cutting edge 21 or the plate 23 could be replaced with a heatable, extremely close-meshed grid with openings in the micrometer range. As shown in FIGS. 3 to 5, the process may be applied for simultaneous production of a plurality of containers, preferably containers of small volume in the form of ampules, or for production of a container produced individually from a tube extruded in each operating cycle. The containers may be formed by blow moulding or, specifically in the case of containers of very small volume, by vacuum moulding.

While one embodiment has been chosen to illustrate the invention, it will be understood by those skilled in the art that various changes and modifications can be made therein without departing from the scope of the invention as defined in the appended claims.

What is claimed is:

1. A method for producing and filling containers, comprising the steps of:
   extruding a tube of plasticized plastic material into an open mould in an extrusion position;
   bonding the tube at a leading end thereof when the mould is closed to form a container bottom;
   severing the tube above the mould by a separating element to form a fill opening;
   forming a container from the tube in the mould while the mould is closed by generation of a pressure gradient acting on and expanding the tube;
   moving the mould having the container therein with the fill opening from the extrusion position to a filling position while being covered by a sterile barrier formed by a heatable plate heated to a germ-killing temperature, said heatable plate being movable together with the separating element; and
   filling the container in the filling position.

2. A method according to claim 1 wherein
   the germ-killing temperature is higher than 150° C.

3. A method according to claim 2 wherein
   the separating element is a cutting edge immediately adjacent to the heatable plate.

4. A method according to claim 3 wherein
   the cutting edge is mounted on a leading edge of the heatable plate, and severs the tube during movement from a retracted initial position into an operating position, with the heatable plate being moved in a direction such that the heatable plate is positioned above a path of mould movement from the extrusion position to the filling position and the fill opening is covered by the heatable plate throughout travel of the fill opening from the extrusion position to the filling position; and the heatable plate and the cutting edge are retracted from the operating position to the retracted initial position after the mould has reached the filling position.

5. A method according to claim 2 wherein
the germ-killing temperature is higher than 170° C.

6. A method according to claim 5 wherein
the germ-killing temperature is about 200° C.

7. A method according to claim 1 wherein
plural tubes of plasticized plastic material are extruded into a multipart mould for simultaneous production of plural containers; and
the tubes are severed together by the separating element.

8. A method according to claim 1 wherein
the mould is a blow mould with the pressure gradient acting on and expanding the tube into the container being generated by deliver of blast air.

9. A method according to claim 1 wherein
the pressure gradient acting on and expanding the tube into the container is produced by a negative pressure generated between the wall of the mould and an exterior of the tube.

10. A device for producing and filling containers, comprising:
an extruder to extrude at least one tube of plasticized plastic material;
at least one mould located adjacent said extruder in an extrusion position to receive the tube and having mould walls on movable mould parts, said mould parts having beveled edges and being closable to bond a projecting end of the tube and to form a container bottom;
a pressure gradient generator to develop a pressure gradient in said mould acting on and expending the tube into a container on the mould walls;
a cutting edge movable between a retracted initial position and an operating position to sever the tube above the mold and form a fill opening in the tube;
a displacement device coupled to and moving the mould along a movement path from the extrusion position into a filling position to fill the container through the fill opening; and
a heatable plate coupled to said cutting edge and being positioned and dimensioned such that, when said cutting edge is in said operating position, said heatable plate is above said movement path and covers said fill opening when moved along said movement path.

11. A device according to claim 10 wherein
said cutting edge is heatable and is immediately adjacent a projecting edge of said heatable plate;
said heatable plate is movable from a retracted metal position thereof during severing of the tube to an operating position thereof covering said movement path, said movement path of said mould extending transversely to a movement path of said heatable plate.

12. A device according to claim 10 wherein
said heatable plate has a heater embedded therein and at least one temperature measurement sensor thereon for controlling said heater.

13. A device according to claim 12 wherein
said heatable plate comprises multiple layers with outer layers on broad sides thereof formed of stainless steel.

* * * * *